(12) United States Patent
Park et al.

(10) Patent No.: US 10,508,922 B2
(45) Date of Patent: Dec. 17, 2019

(54) ROAD BOUNDARY DETECTION SYSTEM AND METHOD, AND VEHICLE USING THE SAME

(71) Applicants: HYUNDAI MOTOR COMPANY, Seoul (KR); KIA MOTORS CORPORATION, Seoul (KR); UNIVERSITY INDUSTRY FOUNDATION, YOUSEI UNIVERSITY, Seoul (KR)

(72) Inventors: Seongkeun Park, Seoul (KR); Hoon Lee, Gunpo-si (KR); MinkYun Yoo, Seoul (KR); HyunJu Kim, Yongin-si (KR); YoungWon Kim, Suwon-si (KR); JuYun Ro, Seoul (KR); Euntai Kim, Seoul (KR); Beomseong Kim, Seoul (KR)

(73) Assignees: Hyundai Motor Company, Seoul (KR); Kia Motors Corporation, Seoul (KR); University Industry Foundation, Yonsei University, Seoul (KR)

( * ) Notice: Subject to any disclaimer, the term of this patent is extended or adjusted under 35 U.S.C. 154(b) by 539 days.

(21) Appl. No.: 15/233,416

(22) Filed: Aug. 10, 2016

(65) Prior Publication Data
US 2017/0184406 A1 Jun. 29, 2017

(30) Foreign Application Priority Data
Dec. 24, 2015 (KR) ........................ 10-2015-0186097

(51) Int. Cl.
*G01C 21/26* (2006.01)
*B60R 11/04* (2006.01)
(Continued)

(52) U.S. Cl.
CPC .............. *G01C 21/26* (2013.01); *B60R 11/04* (2013.01); *G01B 11/14* (2013.01); *G01B 11/26* (2013.01); *B60R 2011/004* (2013.01)

(58) Field of Classification Search
CPC ....... G01B 11/02; G01B 11/026; G01B 11/03; G01B 11/08; G01B 11/14; G01B 11/26; G06K 9/00798
See application file for complete search history.

(56) References Cited

U.S. PATENT DOCUMENTS 5,155,775 A * 10/1992 Brown .................. G05D 1/024
382/153
2009/0085913 A1* 4/2009 Sakamoto .......... G06K 9/00798
345/420

(Continued)

FOREIGN PATENT DOCUMENTS

JP 2006-126000 A 5/2006
JP 2010-271929 A 12/2010
(Continued)

*Primary Examiner* — Isam A Alsomiri
*Assistant Examiner* — Amanda J Webster
(74) *Attorney, Agent, or Firm* — Morgan, Lewis & Bockius LLP

(57) ABSTRACT

A road boundary detection system includes: an optical scanner configured to emit a light to an object to acquire measurement data reflected from the object; and a processor configured to extract a plurality of straight lines in order of a priority on each of the plurality of straight lines when a higher priority is given to a straight line including more of the contact points, based on the measurement data, configured to calculate a score of each straight line by assigning a score to the contact point included in the extracted straight lines and by assigning a score to a non-contact point included in other straight line having the same angle as the (Continued)

contact point, and configured to select a road boundary according to the priority of the calculated score of each straight lines.

16 Claims, 11 Drawing Sheets

(51) Int. Cl.
*G01B 11/14* (2006.01)
*G01B 11/26* (2006.01)
*B60R 11/00* (2006.01)

(56) References Cited

U.S. PATENT DOCUMENTS

| | | | | |
|---|---|---|---|---|
| 2009/0118994 | A1* | 5/2009 | Mori | G06K 9/00798 701/117 |
| 2010/0014713 | A1* | 1/2010 | Zhang | G06K 9/00798 382/104 |
| 2011/0235861 | A1* | 9/2011 | Nitanda | G06K 9/00798 382/103 |
| 2012/0001769 | A1* | 1/2012 | Nitanda | G01S 17/42 340/901 |
| 2012/0154588 | A1* | 6/2012 | Kim | G06K 9/00798 348/148 |
| 2014/0029852 | A1* | 1/2014 | Pisipati | G06K 9/18 382/182 |
| 2015/0332101 | A1* | 11/2015 | Takaki | B60R 1/00 382/104 |
| 2018/0202815 | A1* | 7/2018 | Asai | G01C 21/30 |

FOREIGN PATENT DOCUMENTS

| | | |
|---|---|---|
| JP | 2015-125695 A | 7/2015 |
| KR | 10-0975749 B1 | 8/2010 |
| KR | 10-1268282 B1 | 5/2013 |
| KR | 10-1383467 B1 | 4/2014 |
| KR | 10-1501851 B1 | 3/2015 |

* cited by examiner

ROAD BOUNDARY DETECTION SYSTEM AND METHOD, AND VEHICLE USING THE SAME

CROSS-REFERENCE TO RELATED APPLICATION(S)

This application claims the benefit of priority to Korean Patent Application No. 10-2015-0186097, filed on Dec. 24, 2015 in the Korean Intellectual Property Office, the disclosure of which is incorporated herein by reference.

TECHNICAL FIELD

The present disclosure relates to a road boundary detection system and method, and a vehicle using the same.

BACKGROUND

A variety of vehicle safety devices have been developed and used in a vehicle in consideration with user convenience and safety.

For example, a vehicle safety device may include a lane keeping assist system (LKAS) to maintain a vehicle within a driving lane by assisting a handle operation of a driver when the vehicle travels on a road. In addition, a smart cruise control (SCC) maintains a certain distance between driving vehicles, an electronic stability control (ESC) maintains a vehicle position to be stable, and a navigation system guides a route to a destination and provides information related to the route to the destination that is selected by a driver.

To implement the above mentioned vehicle safety devices, a vehicle needs information related to a road boundary. However, it is difficult to precisely detect the road boundary since an obstacle such as another vehicle may be present in front of the vehicle.

SUMMARY

An aspect of the present disclosure provides a road boundary detection system and method for recognizing a road boundary by using measurement data acquired by an optical scanner, and by using Scoring Hough Transform algorithm, and a vehicle using the same.

Additional aspects of the present disclosure will be set forth in part in the description which follows and, in part, will be obvious from the description, or may be learned by practice of the present disclosure.

In accordance with an embodiment in the present disclosure, a road boundary detection system includes an optical scanner configured to emit a light to an object to acquire measurement data reflected from the object; a parameter space generator configured to generate a parameter space by extracting a distance and an angle of each of a plurality of contact point based on the measurement data and configured to extract a plurality of straight lines in order of a priority on each of the plurality of straight lines when a higher priority is given to a straight line including more of the contact points; a score calculator configured to calculate a score of each straight line by assigning a cumulative score of a parameter space to a contact point included in the plurality of straight lines and to a non-contact point included in other straight line having the same angle as the contact point; and a road boundary determiner configured to recognize a road boundary by selecting a straight line according to the priority of the score of each straight lines, which is calculated through the score calculator.

The parameter space generator may generate the parameter space based on a parameter of linear equation based on the measurement data.

The score calculator may calculate a score of each straight lines by assigning a plus (+) score to each of contact points included in the plurality of straight lines, and by assigning a minus (−) score to a non-contact point included in other straight line having the same angle as any one of the plurality of contact points.

The score calculator may calculate a score of each straight line by using Scoring Hough Transform algorithm (Accumulator*($Z^t$)), wherein the Scoring Hough Transform algorithm may be, $$\text{Accumulator}^*(Z^t) = \sum_{i=1}^{N} \left[ \text{Accumulator}(r_i, \theta_i) - \sum_{j=1}^{|r_i|-1} \text{Accumulator}((r_i - j), \theta_i) \right]$$

and $r_i$ may represent a distance and, $\theta_i$ may represent an angle.

The road boundary determiner may select a straight line for a road boundary according to the priority of the high score in the plurality of straight line in which each score is calculated through the score calculator.

The road boundary determiner may divide the parameter space into a left side road boundary and a right side road boundary by comparing a distance and an angle of the plurality of contact points included in the parameter space with a predetermined left side and right side boundary condition.

The optical scanner may be a laser scanner.

In accordance with another embodiment in the present disclosure, a vehicle includes an optical scanner configured to emit a light to an object to acquire measurement data reflected from the object; and a processor configured to extract a plurality of straight lines in order of a priority on each of the plurality of straight lines when a higher priority is given to a straight line including more of the contact points, based on the measurement data, configured to calculate a score of each straight line by assigning a score to the contact point included in the extracted straight lines and by assigning a score to a non-contact point included in other straight line having the same angle as the contact point, and configured to select a road boundary according to the priority of the calculated score of each straight lines.

The processor may include a parameter space generator configured to generate a parameter space by extracting a distance and an angle of each of a plurality of contact point based on the measurement data and configured to extract a plurality of straight lines in order of a priority on each of the plurality of straight lines when a higher priority is given to a straight line including more of the contact points; a score calculator configured to calculate a score of each straight line by assigning a cumulative score of a parameter space to a contact point included in the plurality of straight lines and to a non-contact point included in other straight line having the same angle as the contact point; and a road boundary determiner configured to recognize a road boundary by selecting a straight line according to the priority of the score of each straight lines, which is calculated through the score calculator.

The parameter space generator may generate the parameter space based on a parameter of linear equation based on the measurement data.

The score calculator may calculate a score of each straight lines by assigning a plus (+) score to each of contact points included in the plurality of straight lines, and by assigning a minus (−) score to a non-contact point included in other straight line having the same angle as any one of the plurality of contact points.

The score calculator may calculate a score of each straight line by using Scoring Hough Transform algorithm (Accumulator*($Z^t$)), wherein the Scoring Hough Transform algorithm may be $$\text{Accumulator}^*(Z^t) = \sum_{i=1}^{N}\left[\text{Accumulator}(r_i, \theta_i) - \sum_{j=1}^{[r_i]-1}\text{Accumulator}((r_i - j), \theta_i)\right]$$

and $r_i$ may represent a distance and, $\theta_i$ may represent an angle.

The road boundary determiner may select a straight line for a road boundary according to the priority of the high score in the plurality of straight line in which each score is calculated through the score calculator.

The road boundary determiner may divide the parameter space into a left side road boundary and a right side road boundary by comparing a distance and an angle of the plurality of contact points included in the parameter space with a predetermined left side and right side boundary condition.

The optical scanner may be a laser scanner.

In accordance with another embodiment in the present disclosure, a road boundary detection method includes acquiring measurement data reflected from the object when an optical scanner emits a light to an object; generating a parameter space by extracting a distance and an angle of each of contact point based on the measurement data; extracting a plurality of straight lines in order of a priority on each of the plurality of straight lines when a higher priority is given to a straight line including more of the contact points; calculating a score of each straight line by assigning a cumulative score of a parameter space to a contact point included in the plurality of straight lines and to a non-contact point included in other straight line having the same angle as the contact point; and recognizing a road boundary by selecting a straight line according to the calculated score of each straight line.

The step of generating the parameter space may generate the parameter space by using a parameter of linear equation based on the measurement data.

The step of calculating the score of each straight line may calculate the score of each straight line by assigning a plus (+) score to each of contact points included in the plurality of straight lines, and by assigning a minus (−) score to a non-contact point included in other straight line having the same angle as any one of the plurality of contact points.

The step of calculating the score of each straight line may calculate the score of each straight line by using a Scoring Hough Transform algorithm (Accumulator*($Z^t$)), wherein the Scoring Hough Transform algorithm may be $$\text{Accumulator}^*(Z^t) = \sum_{i=1}^{N}\left[\text{Accumulator}(r_i, \theta_i) - \sum_{j=1}^{[r_i]-1}\text{Accumulator}((r_i - j), \theta_i)\right],$$

and $r_i$ may represent a distance and, $\theta_i$ may represent an angle.

The recognition of the road boundary may select the straight line for a road boundary according to the high score in the plurality of straight lines.

BRIEF DESCRIPTION OF THE DRAWINGS

These and/or other aspects of the disclosure will become apparent and more readily appreciated from the following description of embodiments, taken in conjunction with the accompanying drawings of which.

DETAILED DESCRIPTION

Figure 1:
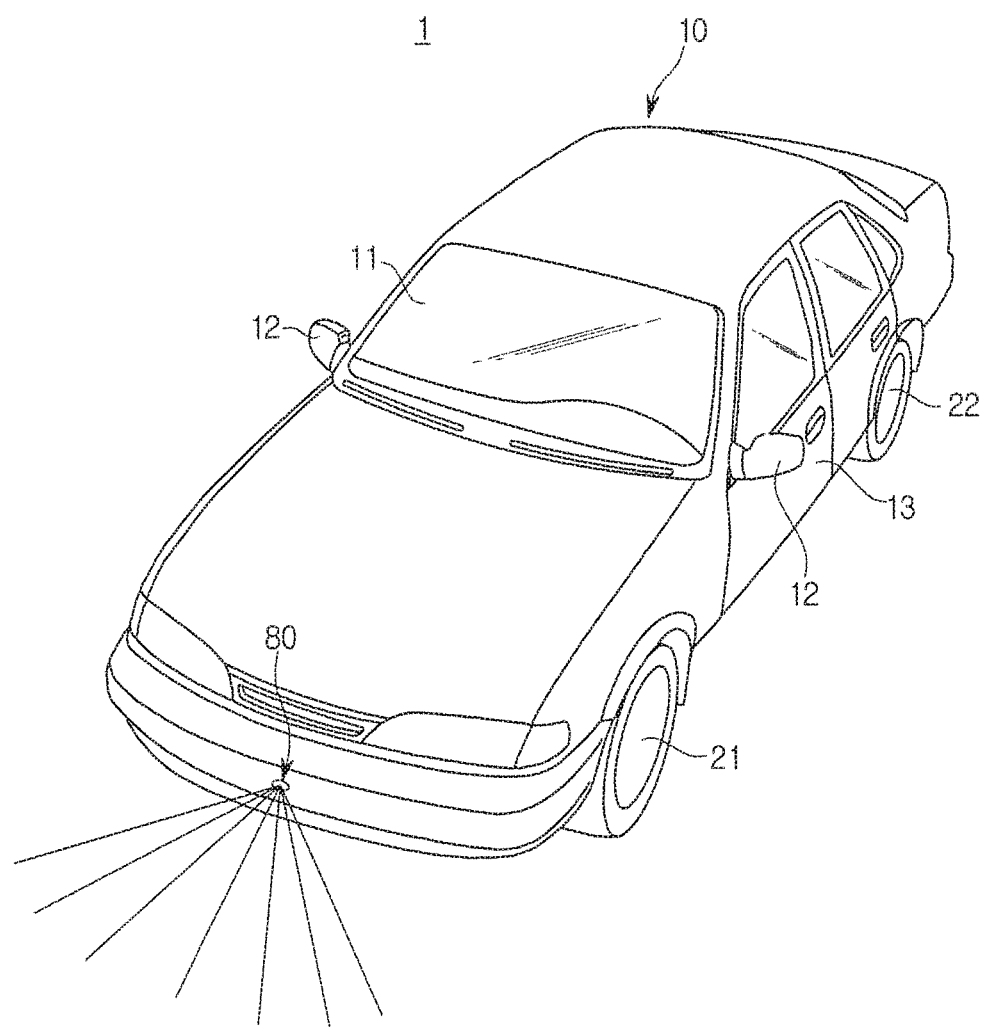
FIG. 1 illustrates an exterior view of a vehicle.

The present disclosure will be described more fully hereinafter with reference to the accompanying drawings, in which exemplary embodiments are shown. In case of adding a reference numeral to components of each drawing, it may be noted that the same component has the same reference numeral although shown in other drawing. Parts which are not associated with the description are omitted in order to specifically describe the present disclosure, and like reference numerals refer to like elements throughout the specification. If it is determined that a detailed description of commonly-used technologies or structures related to the embodiments of the present disclosure may unnecessarily obscure the subject matter of the present disclosure, the detailed description will be omitted. Further, in the following detailed description, names of components, which are in the same relationship, are divided into "the first", "the second", and the like, but the present disclosure is not limited to the order in the following description.

Figure 2:
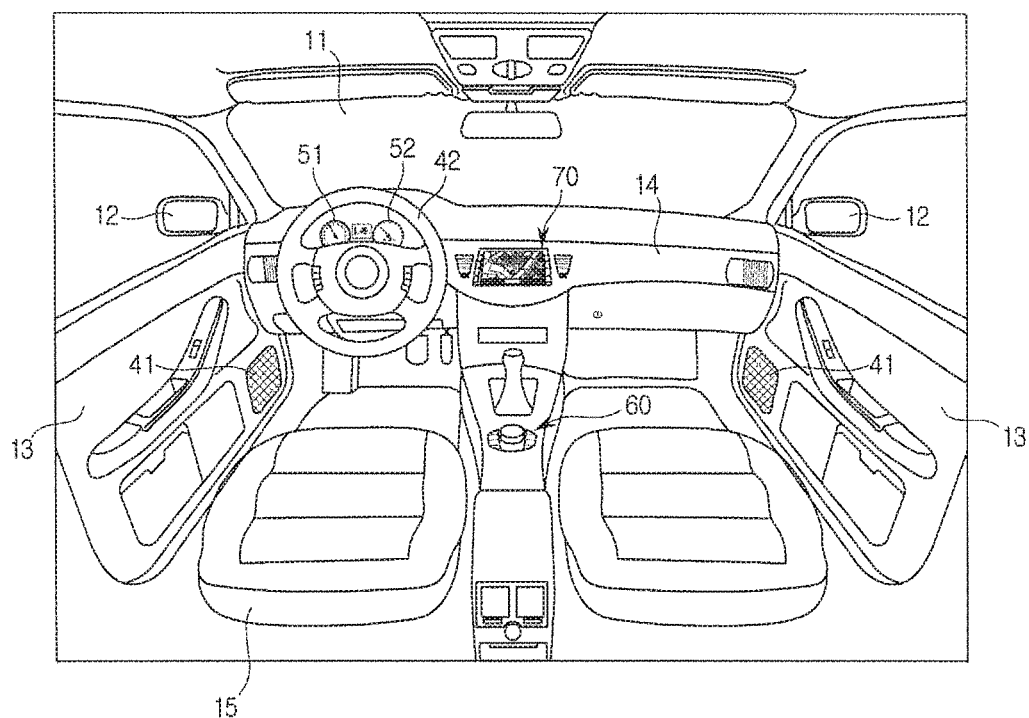
FIG. 2 illustrates an interior view of a vehicle.

FIG. 1 illustrates an exterior view of a vehicle, and FIG. 2 illustrates an interior view of the vehicle.

Referring to FIG. 1, a vehicle 1 includes a body 10 forming an exterior of the vehicle 1, a windscreen 11 providing a front view of the vehicle 1 to a driver, a side mirror 12 providing a view of a rear side of the vehicle 1 to the driver, a door 13 closing the inside of the vehicle 1 from the outside, and vehicle wheels 21 and 22 moving the vehicle 1 by including a front wheel 21 disposed on a front side of the vehicle and a rear wheel 22 disposed on a rear side of the vehicle.

The windscreen 11 may be provided on an upper portion of the front of the body 10 to allow the driver inside the vehicle 1 to acquire visual information about the front of the vehicle 1. The side mirror 12 may include a left side mirror provided on the left side of the body 10 and a right side mirror provided on the right side of the body 10, and may allow the driver inside the vehicle 1 to acquire visual information of the lateral side and the rear side of the vehicle 1.

The door 13 may be rotatably provided on a right side and a left side of the body 10. When the door 13 is opened, a driver may be allowed to be seated in the vehicle 1, and when the door 13 is closed, the inside of the vehicle 1 may be closed from the outside.

The vehicle 1 may have an optical scanner 80 configured to acquire measurement data reflected by an object by emitting a light to the object. As illustrated in FIG. 1, the optical scanner 80 may be provided in a bumper of the vehicle 1, but is not limited thereto.

The interior of the vehicle 1 may include a dashboard 14 in which a variety of devices are installed to allow a driver to operate the vehicle 1, a driver seat 15 in which the driver is seated, a cluster display unit configured to display operation information of the vehicle 1, and a navigation device 70 configured to perform an audio function and a video function as well as a navigation function guiding a driving route from a departure to a destination in response to an operation command of the driver.

The dashboard 14 may protrude from a lower side of the windscreen 11 to the driver so that the driver may operate a variety of devices installed in the dashboard 14 while staring at the front.

The driver seat 15 may be provided in a rear side of the dashboard 14 so that the driver may drive the vehicle 1 in a stable position while staring at the front and the variety of devices of the dashboard 14.

The cluster display unit may be provided in the driver seat 15 of the dashboard 14 and include a speedometer 51 indicating a driving speed of the vehicle 1 and a revolutions per minute (RPM) gauge 52 indicating a rotation speed of a driving device (not shown).

The navigation device 70 may include: a display displaying road information related to the traveling road of the vehicle 1 or a route to a destination; and a speaker 41 outputting a sound according to an operation command of the driver. In recent, an audio video navigation (AVN) device has been developed so that an audio device, a video device and a navigation device are integrally formed is installed in a vehicle.

The navigation device 70 may be installed in a center fascia. The center fascia may represent a control panel between a driver seat and a passenger seat in the dash board 14, and may represent a portion in which the dash board 14 and a shift lever are vertically joined. In addition, an air conditioning device, a controller of a heater, a blowing port, a cigar jack, an ashtray, and a cup holder as well as the navigation device 70 may be installed in the center fascia. The center fascia together with a center console may distinguish the driver seat from the passenger seat.

The vehicle 1 may have an additional jog dial 60 to operate to drive a variety of devices including the navigation device 70.

According to the present disclosure, the jog dial 60 may perform an operation of drive by rotating or pressing, and may perform writing recognition by using the user's finger or an additional device having a touch recognition function by a touch pad having a touch recognition function.

In addition to above mentioned components, the vehicle 1 may include a driving device (not shown) configured to rotate wheels (not shown), a steering system (not shown) configured to change the driving direction of the vehicle 1, and a brake system (not shown) configured to stop the driving of the wheels.

The driving device may supply a torque to a front wheel or a rear wheel so that the body 10 may be moved back and forth. The driving device may include an engine generating a torque by burning the fossil or a motor configured to generate a torque by receiving the power from a battery (not shown).

The steering system may include a steering wheel 42 receiving a driving direction from a driver, a steering gear (not shown) changing a rotary motion of the steering wheel 42 to a reciprocating motion, and a steering linkage (not shown) delivering the reciprocating motion of the steering gear (not shown) to the front wheel. Accordingly, the steering system may change the driving direction of the vehicle 1 by changing the direction of the rotary axis of the wheels.

The brake system may include a brake pedal (not shown) receiving a brake operation from a driver, a brake drum (not shown) coupled to the wheels, and a brake shoe (not shown) stopping the rotation of the brake drum (not shown) by using friction force. Accordingly, the brake system may stop the driving of the vehicle 1 by stopping the rotation of the wheels.

Figure 3:
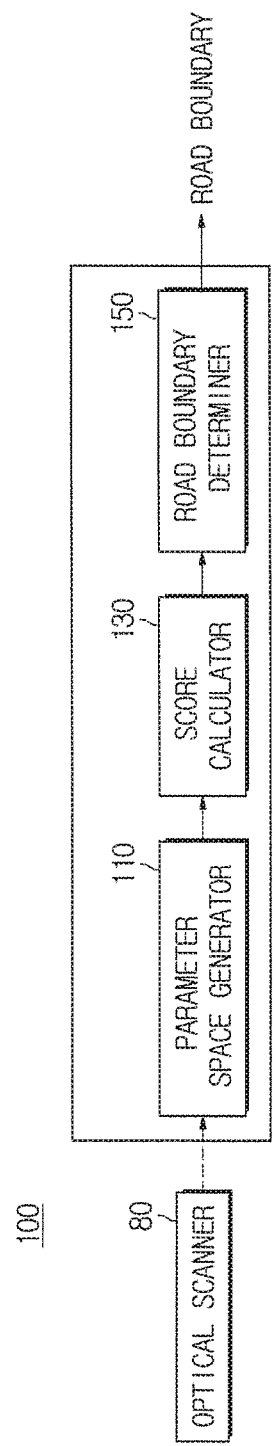
FIG. 3 is a view illustrating a configuration of a road boundary detection system.
Figure 4:
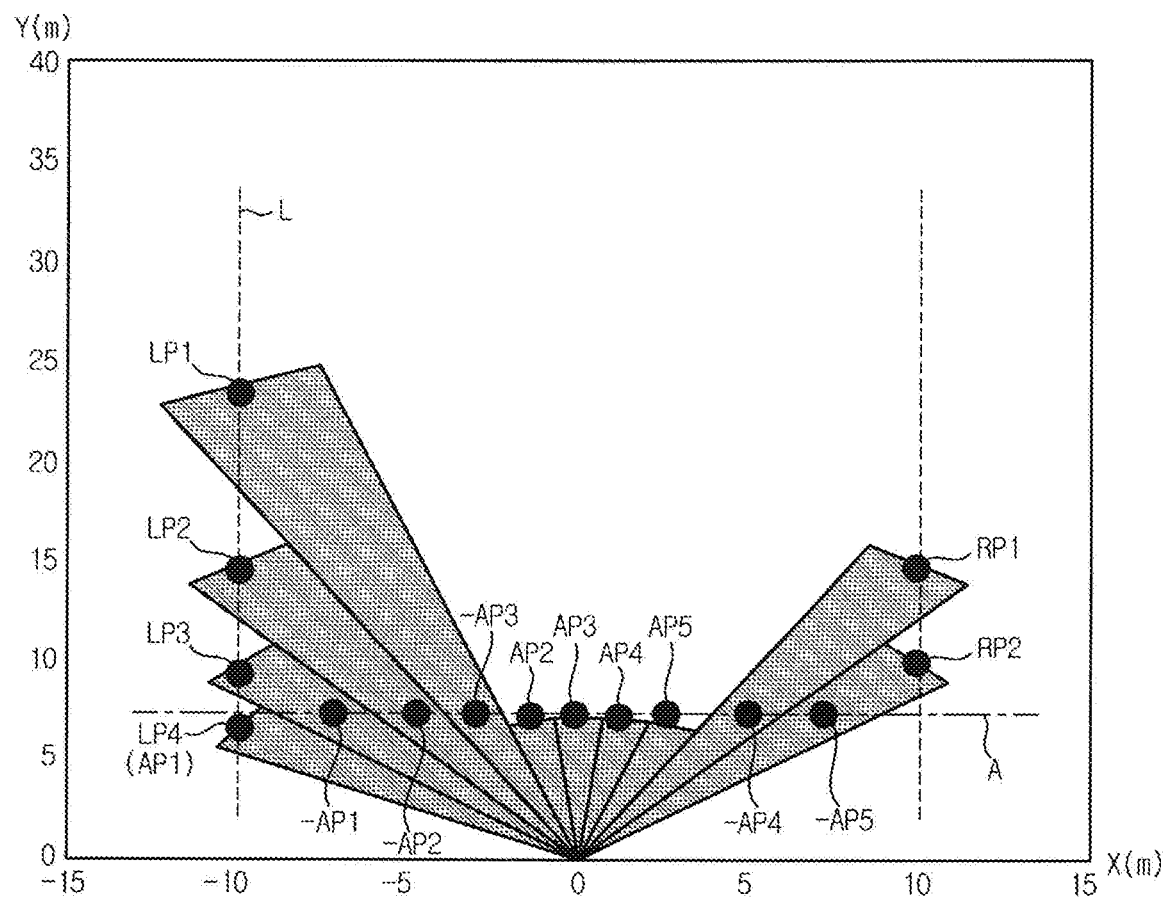
FIG. 4 is a view illustrating an example of an occupancy map generated by using measurement data.
Figure 5:
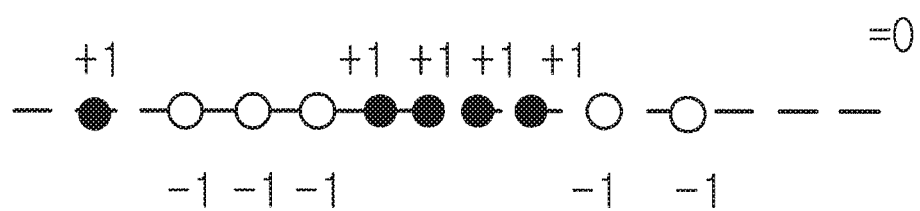
FIG. 5 is a view illustrating a method of calculating a score of a straight line.
Figure 6:
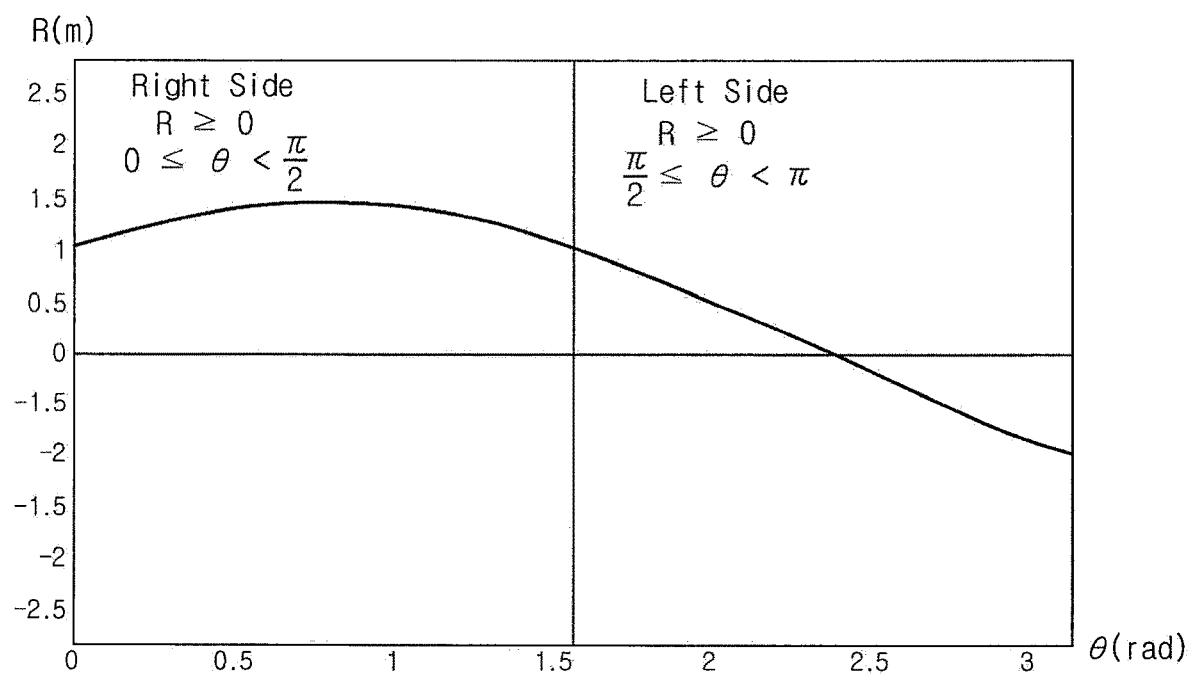
FIG. 6 is a view illustrating a method of distinguishing a left side road boundary from a right side road boundary in a parameter space.
Figure 7:
FIG. 7 is a view illustrating an image of a front side in which a vehicle is traveling.
Figure 8:
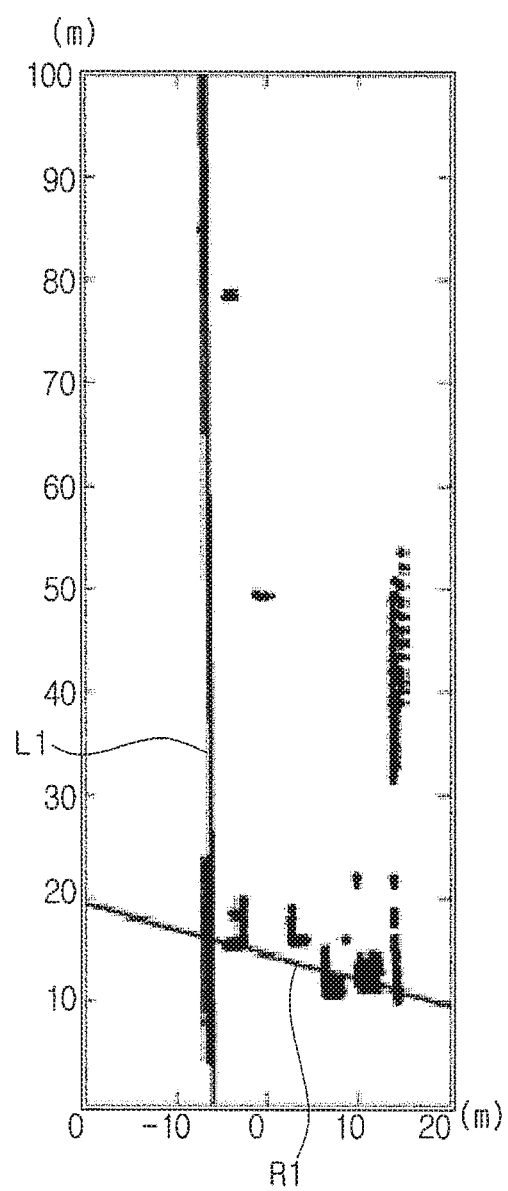
FIG. 8 is a view illustrating a result of detecting a road boundary by using a standard algorithm under a condition as illustrate in FIG. 7.
Figure 9:
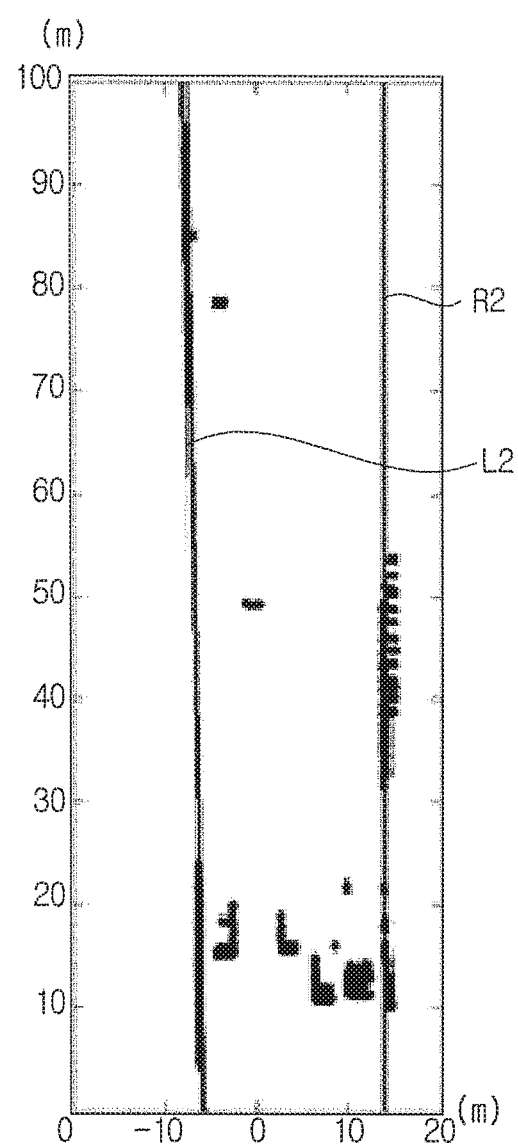
FIG. 9 is a view illustrating a result of detecting a road boundary by using Scoring Hough Transform algorithm under a condition as illustrate in FIG. 7.

Hereinafter the present disclosure will be described with reference to FIG. 3 illustrating a configuration of a road boundary detection system, FIG. 4 illustrating an example of an occupancy map generated by using measurement data, FIG. 5 illustrating a method for calculating a score of a straight line, FIG. 6 illustrating a method for distinguishing a left side road boundary from a right side road boundary in a parameter space, FIG. 7 illustrating an image of a front side in which a vehicle is travelling, FIG. 8 illustrating a result of detecting a road boundary by using a standard algorithm under a condition as illustrate in FIG. 7, and FIG. 9 illustrating a result of detecting a road boundary by using Scoring Hough Transform algorithm under a condition as illustrate in FIG. 7.

Referring to FIG. 3, a road boundary detection system 100 may include an optical scanner 80, a parameter space generator 110, a score calculator 130, and a road boundary determiner 150.

Particularly, the optical scanner 80 may obtain measurement data reflected from an object by emitting a light to the object. The optical scanner 80 may be a laser scanner configured to measure a distance from a location to which the optical scanner is mounted, to the object by using a laser beam (infrared light).

The parameter space generator 110 may be configured to generate a parameter space by extracting a distance and an angle of each of a plurality of contact points based on the measurement data and to extract a plurality of straight lines in order of a priority on each of the plurality of straight lines when a higher priority is given to a straight line including more of the contact points.

The parameter space generator 110 may generate a parameter space based on a parameter of linear equation based on the measurement data.

For example, measurement data illustrated in FIG. 4 may be the followings.

$$Z^t = \left[\left(14.1, \frac{4}{16}\pi\right), \left(18.0, \frac{3}{16}\pi\right), \left(7.4, \frac{2}{16}\pi\right), \left(7.1, \frac{1}{16}\pi\right), \left(7.0, \frac{0}{16}\pi\right),\right.$$
$$\left.\left(7.1, -\frac{1}{16}\pi\right), \left(26, -\frac{2}{16}\pi\right), \left(18, -\frac{3}{16}\pi\right), \left(14, -\frac{4}{16}\pi\right), \left(12, -\frac{5}{16}\pi\right)\right]$$

where $Z^t$ represents a set of contact points, particularly a set of a distance and an angle of each contact point.

A result of Hough transformation, in which a voting the above-mentioned measurement data is performed by accumulating accumulators generated in each point, may be the following.

$$\text{Accumulator}(Z^t) = \text{Accumulator}\left(14.1\frac{4}{16}\pi\right) + \text{Accumulator}\left(18.0, \frac{3}{16}\pi\right) +$$
$$\text{Accumulator}\left(7.4, \frac{2}{16}\pi\right) + \text{Accumulator}\left(7.1, \frac{1}{16}\pi\right) +$$
$$\text{Accumulator}\left(7.0, \frac{0}{16}\pi\right) + \text{Accumulator}\left(7.1 - \frac{1}{16}\pi\right) +$$
$$\text{Accumulator}\left(26.0, -\frac{2}{16}\pi\right) + \text{Accumulator}\left(28.0, -\frac{3}{16}\pi\right) +$$
$$\text{Accumulator}\left(14.0, -\frac{4}{16}\pi\right) + \text{Accumulator}\left(12.0, -\frac{5}{16}\pi\right)$$

Referring to FIG. 4, the parameter space generator 110 may extract a plurality of straight lines (L, R, A) including contact points (LP1, LP2, LP3, LP4(AP1), RP1, RP2, AP2, AP3, AP4, AP5) based on measurement data obtained by emitting a light to an object from the optical scanner 80. It may be confirmed that the straight line (L) includes four contact points, the straight line (R) includes two contact points, and the straight line (A) includes five contact points. Since a road boundary is present in the farthest position from the road, it may be assumed that a straight line corresponding to a road boundary does not include an empty space (hereinafter referred to as "non-contact point"), and thus, a road boundary may be precisely extracted by applying a penalty to a non-contact point included in a straight line.

The score calculator 130 may calculate a score of each straight line by assigning a cumulative score of a parameter space to a contact point included in the plurality of straight lines and to a non-contact point included in another straight line having the same angle as the contact point.

Particularly, the score calculator 130 may calculate a score of each of straight lines by assigning a plus (+) score to each of contact points included in the plurality of straight lines, and by assigning a minus (−) score to a non-contact point included in other straight line having the same angle as any one of the plurality of contact points.

Referring to FIGS. 4 and 5, as for the straight lines L, R, and A extracted by the parameter space generator 110, the score calculator 130 may calculate a score by assigning a plus (+) score (e. g. +1) to contact points (LP1, LP2, LP3, LP4, RP1, RP2, AP1, AP2, AP3, AP4, AP5) and by assigning a minus (−) score (e. g. −1) to non-contact points (−AP1, −AP2, −AP3, −AP4, −AP5).

Referring to FIG. 4, a contact point LP1 may correspond to the same beam as a non-contact point −AP3 being placed in the straight line (A) that is other line having the same angle as the contact point LP1. The non-contact point −AP3 may be applied as a penalty when calculating a score of the straight line (A).

Referring to FIG. 5, a score of the straight line (A) may become 0 (zero) by assigning +1 to AP1, AP2, AP3, AP4, AP5, respectively, and by assigning −1 to −AP1, −AP2, −AP3, −AP4, −AP5, respectively. According to the above-mentioned method, a score of the straight line (L) may become 4, and a score of the straight line (R) may become 2. That is, a score for each of the the straight lines has a higher value in order of straight line (L), the straight line (R), and the straight line (A).

As for the description of the above-mentioned method of assigning a penalty to a non-contact point based on Scoring Hough Transform algorithm, the score calculator 130 may calculate a score of each straight line by using Scoring Hough Transform algorithm (Accumulator*($Z^t$)) of Equation 1.

$$\text{Accumulator}^*(Z^t) = \sum_{i=1}^{N}\left[\text{Accumulator}(r_i, \theta_i) - \sum_{j=1}^{[r_i]-1}\text{Accumulator}((r_i - j), \theta_i)\right] \quad \text{Equation 1}$$

Accumulator*($Z^t$) may represent Scoring Hough Transform algorithm, and particularly represent a cumulative score of parameter space in which a penalty is assigned to a non-contact point. In the present disclosure, a score that is calculated by Scoring Hough Transform algorithm may represent a score of each straight line.

The above-mentioned $r_i$ may represent a distance and, $\theta_i$ may represent an angle. "accummulator" may represent the quantization of Scoring Hough Space.

That is, the equation 1 may represent that a score of a straight line=a plurality of contact points (distance and angle)−a plurality of non-contact points (distance and angle). The contact point may represent a position in an object in which the light is contacted when an optical scanner emits a light to the object, and a non-contact point may represent an empty space, in which a light is not contacted, included in other straight line, which has the same angle as the contact point and is not a straight line including the contact point.

For example, an equation of Scoring Hough Transform Accumulator*($Z^t$) about the contact point and the non-contact point of FIG. 4 may be the followings.

$$\text{Accumulator}(Z^t)^* = \begin{bmatrix} \text{Accumulator}\left(14.1, \frac{4}{16}\pi\right) \\ +\text{Accumulator}\left(18.0, \frac{3}{16}\pi\right) \\ +\text{Accumulator}\left(7.4, \frac{2}{16}\pi\right) \\ +\text{Accumulator}\left(7.1, \frac{1}{16}\pi\right) \\ +\text{Accumulator}\left(7.0, \frac{0}{16}\pi\right) \\ +\text{Accumulator}\left(7.1, -\frac{1}{16}\pi\right) \\ +\text{Accumulator}\left(26, -\frac{2}{16}\pi\right) \\ +\text{Accumulator}\left(18, -\frac{3}{16}\pi\right) \\ +\text{Accumulator}\left(14, -\frac{4}{16}\pi\right) \\ +\text{Accumulator}\left(12, -\frac{5}{16}\pi\right) \end{bmatrix} \begin{bmatrix} -\text{Accumulator}\left(13.1, \frac{4}{16}\pi\right) - \text{Accumulator}\left(12.1, \frac{4}{16}\pi\right) - \ldots \\ -\text{Accumulator}\left(17.0, \frac{3}{16}\pi\right) - \text{Accumulator}\left(16.0, \frac{3}{16}\pi\right) - \ldots \\ -\text{Accumulator}\left(6.4, \frac{2}{16}\pi\right) - \text{Accumulator}\left(5.4, \frac{2}{16}\pi\right) - \ldots \\ -\text{Accumulator}\left(6.1, \frac{1}{16}\pi\right) - \text{Accumulator}\left(5.1, \frac{1}{16}\pi\right) - \ldots \\ -\text{Accumulator}\left(6.0, \frac{0}{16}\pi\right) - \text{Accumulator}\left(5.0, \frac{0}{16}\pi\right) - \ldots \\ -\text{Accumulator}\left(6.1, -\frac{1}{16}\pi\right) - \text{Accumulator}\left(5.1, -\frac{1}{16}\pi\right) - \ldots \\ -\text{Accumulator}\left(25.0, -\frac{2}{16}\pi\right) - \text{Accumulator}\left(24.0, -\frac{2}{16}\pi\right) - \ldots \\ -\text{Accumulator}\left(17.0, -\frac{3}{16}\pi\right) - \text{Accumulator}\left(16.0, -\frac{3}{16}\pi\right) - \ldots \\ -\text{Accumulator}\left(13.0, -\frac{4}{16}\pi\right) - \text{Accumulator}\left(12.0, -\frac{4}{16}\pi\right) - \ldots \\ -\text{Accumulator}\left(11.0, -\frac{5}{16}\pi\right) - \text{Accumulator}\left(10.0, -\frac{5}{16}\pi\right) - \ldots \end{bmatrix}$$

The road boundary determiner 150 may recognize a road boundary by selecting a straight line based on the priority in the score of each straight line calculated by the score calculator 130.

Particularly, the road boundary determiner 150 may select a straight line for a road boundary according to the priority of the high score among the plurality of straight lines in which each score is calculated by the score calculator 130.

The road boundary determiner 150 may divide the parameter space in to the left side road boundary and the right side road boundary by comparing the distance and the angle of the plurality of contact points included in the parameter space with a predetermined left side and right side boundary condition.

Referring to FIG. 6, the road boundary determiner 150 may determine that a road boundary is the right side when a distance (R) of the contact point is equal to or larger than 0 (zero), and an angle ($\theta$) of the contact point is equal to or larger than 0 (zero) and less than $\pi/2$, and may determine that a road boundary is the left side when a distance (R) of the contact point is equal to or larger than 0 (zero), and an angle ($\theta$) of the contact point is equal to or larger than $\pi/2$ and less than $\pi$.

According to the present disclosure, in a state in which a driving vehicle is present in front, when detecting a road boundary, as illustrated in FIG. 7, a road boundary may be precisely detected as illustrated in L2 and R2 of FIG. 9 without detecting L1 and R1 as a road boundary due to a malfunction in which a front vehicle is wrongly recognized as a lane, as illustrated in FIG. 8.

Under a condition as illustrated in FIG. 4, an error of a distance ($D_L$, $D_R$) and an angle ($\alpha_L$, $\alpha_R$) between detecting a road boundary by using Standard Hough Transform and detecting a road boundary by using Scoring Hough Transform may be Table 1 as the followings.

TABLE 1

| Algorithm | $D_L$ | $\alpha_L$ | $D_R$ | $\alpha_R$ |
|---|---|---|---|---|
| Standard Hough Transform | 0.286903 | 0.024062 | 12.35383 | 0.563927 |
| Scoring Hough Transform | 0.137722 | 0.021436 | 0.905831 | 0.030203 |

Figure 10:
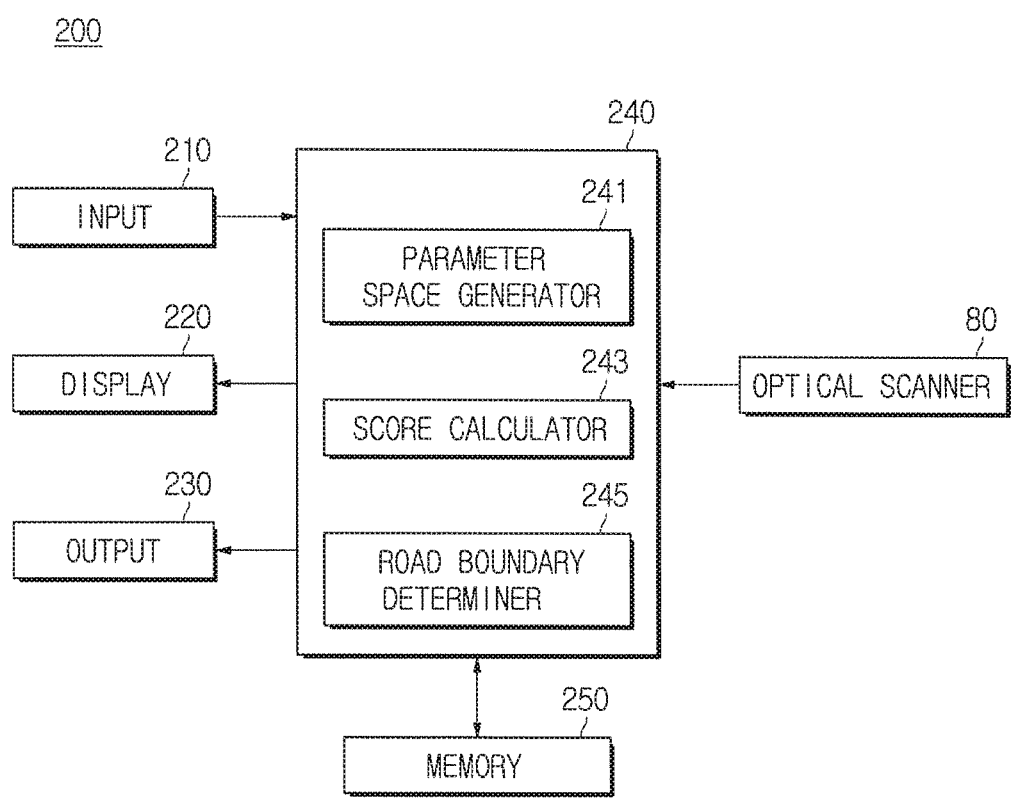
FIG. 10 is a control block diagram illustrating a configuration of a vehicle to detect a road boundary.

FIG. 10 is a control block diagram illustrating a configuration of a vehicle to detect a road boundary.

As illustrated in FIG. 10, a vehicle 200 may include an optical scanner 80, an input 210, a display 220, an output 230, a processor 230, and a memory 250.

The optical scanner 80 may be configured to obtain measurement data reflected from an object by emitting a light to the object. The optical scanner 80 may be disposed in a bumper of the vehicle 1, as illustrated in FIG. 1, but is not limited thereto. The optical scanner 80 may be a laser scanner.

The input 210 may be configured to receive control information, which is input through an operation of a user, for operations of a variety of services that may be implemented in the vehicle 200. When the above-mentioned display 220 is operatable by a touch, the input 210 may be implemented to be integrally formed with the display 220.

The display 220 may allow a user to check information related to services implemented in the vehicle 200 according to the control of the processor 240 by displaying the information. When the display 220 is a LCD user interface (UI) configured to display an icon and a text, the display 220 may display information related to the service by an icon and a text. In addition, when the display 220 is a LCD UI, the display 220 may display information related to the service by lighting or flashing.

The display 220 may include at least one of liquid crystal display, a thin film transistor-liquid crystal display, an organic light-emitting diode, a flexible display, and a 3D display.

The output 230 may be configured to output information related to services performed in the vehicle 200 in a voice manner.

In this case, the output 230 may further include a digital-to-analog convertor (DAC) configured to convert a digitalized electrical signal into an analog signal and an amplifier configured to amplify an electrical signal that is converted into an analog signal by the DAC.

The processor 240 may extract a plurality of straight lines in order of a priority on each of the plurality of straight lines when a higher priority is given to a straight line including more of the contact points, based on the measurement data, calculate a score of each straight line by assigning a score to the contact point included in the extracted straight lines and by assigning a score to a non-contact point included in other straight line having the same angle as the contact point, and select a road boundary according to the priority of the calculated score of each straight lines.

Particularly, the processor 240 may include a parameter space generator 241, a score calculator 243, and a road boundary determiner 245.

The parameter space generator 241 may be configured to generate a parameter space by extracting a distance and an angle of each of a plurality of contact points based on the measurement data, and configured to extract a plurality of straight lines in order of a priority on each of the plurality of straight lines when a higher priority is given to a straight line including more of the contact points.

The parameter space generator 241 may generate a parameter space based on a parameter of linear equation based on the measurement data.

The score calculator 243 may calculate a score of each straight line by assigning a cumulative score of a parameter space to a contact point included in the plurality of straight lines and to a non-contact point included in other straight line having the same angle as the contact point.

The score calculator 243 may calculate a score of each of straights lines by assigning a plus (+) score to each of contact points included in the plurality of straight lines, and by assigning a minus (−) score to a non-contact point included in other straight line having the same angle as any one of the plurality of contact points.

The score calculator 243 may calculate a score of each straight line by using Scoring Hough Transform algorithm (Accumulator*($Z^r$)) of Equation 1.

The road boundary determiner 245 may recognize a road boundary by selecting a straight line based on the priority of the score of each straight line calculated by the score calculator 243.

Particularly, the road boundary determiner 245 may select a straight for a road boundary according to the priority of the high score among the plurality of straight lines in which each score is calculated by the score calculator 243. For example, it is assumed that a road is formed with two boundaries, and thus, the road boundary determiner 245 may determine a road boundary by selecting two straight lines in the order of higher score.

The road boundary determiner 245 may divide the parameter space in to a left side road boundary and a right side road boundary by comparing the distance and the angle of the plurality of contact points included in the parameter space with a predetermined left side and right side boundary condition.

The memory 250 may store information that is required for the implementation of the service in the vehicle 200.

Figure 11:
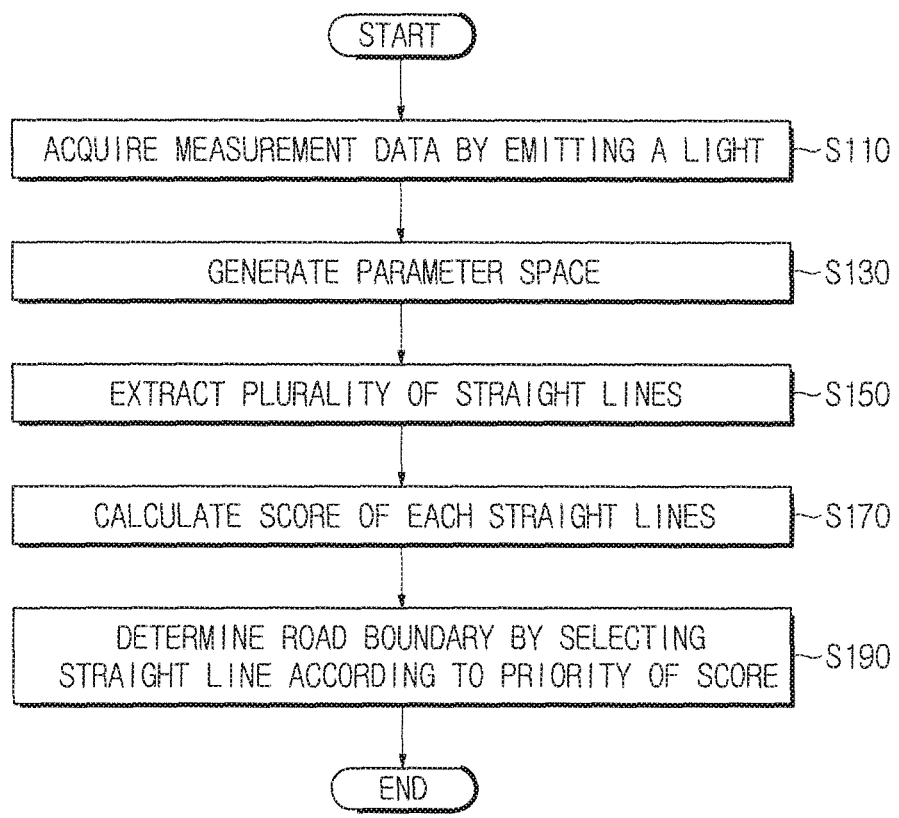
FIG. 11 is a flow chart illustrating a method of detecting a road boundary.

FIG. 11 is a flow chart illustrating a method of detecting a road boundary.

Hereinafter a detail description of the same configuration those shown in FIG. 3 will be omitted.

When the optical scanner 80 emits a light to an object, the road boundary detection system 100 may acquire measurement data reflected from the object (S110).

The road boundary detection system 100 may generate a parameter space by extracting a distance and an angle of each of a plurality of contact point based on the measurement data (S130).

The road boundary detection system 100 may generate a parameter space by using a parameter of linear equation based on the measurement data.

The road boundary detection system 100 may extract a plurality of straight lines in order of a priority on each of the plurality of straight lines when a higher priority is given to a straight line including more of the contact points (S150).

The road boundary detection system 100 may calculate a score of each straight line by assigning a cumulative score of a parameter space to a contact point included in the plurality of straight lines and to a non-contact point included in other straight line having the same angle as the contact point (S170).

The road boundary detection system 100 may calculate a score of each of straights lines by assigning a plus (+) score to each of contact points included in the plurality of straight lines, and by assigning a minus (−) score to a non-contact point included in other straight line having the same angle as any one of the plurality of contact points.

Particularly, the road boundary detection system 100 may calculate a score of each straight line by using Scoring Hough Transform algorithm (Accumulator*($Z^r$)) of Equation 1.

The road boundary detection system 100 may recognize a road boundary by selecting a straight line according to the priority of the calculated score of each straight line (S190).

At this time, the road boundary detection system 100 may select a straight line for a road boundary, which has the highest score, in the plurality of straight lines.

Although not shown, the road boundary detection system 100 may divide the parameter space into the left side road boundary and the right side road boundary by comparing the distance and the angle of the plurality of contact points included in the parameter space with a predetermined left side and right side boundary condition.

Referring back to FIG. 6, the road boundary detection system 100 may determine that a road boundary is the right side when a distance (R) of the contact point is equal to or larger than 0 (zero), and an angle (θ) of the contact point is equal to or larger than 0 (zero) and less than π/2, and may determine that a road boundary is the left side when a distance (R) of the contact point is equal to or larger than 0 (zero), and an angle (θ) of the contact point is equal to or larger than π/2 and less than π.

As is apparent from the above description, according to the proposed road boundary detection system and method, and vehicle using the same, since a road boundary is detected by using the Scoring Hough Transform algorithm configured to assign a penalty to an empty space, when detecting a road boundary by using measurement data acquired by an optical scanner, even though there is an obstacle in front of a vehicle in a road, a correct road boundary may be detected, and thus the reliability of the result of the road boundary detection may be improved.

Although a few embodiments have been shown and described, it would be appreciated by those skilled in the art that changes may be made in these embodiments without departing from the principles and spirit of the disclosure, the scope of which is defined in the claims and their equivalents.

What is claimed is:

1. A road boundary detection system comprising:
   an optical scanner configured to emit a light to an object to acquire measurement data reflected from the object;

a parameter space generator configured to:
  generate a parameter space by extracting a plurality of contact points and extracting a distance and an angle of each of the plurality of contact points based on the measurement data; and
  extract a plurality of straight lines including a first straight line and second straight lines in order of a priority on each of the plurality of straight lines, wherein a higher priority is given to each of the plurality of straight lines including more of the extracted contact points;
a score calculator configured to calculate a score of the first straight line by assigning a cumulative score of the parameter space to first contact points included in the first straight line and to second contact points included in the second straight lines, the second contact points having the same angle as the first contact points; and
a road boundary determiner configured to recognize a road boundary by selecting a straight line among the extracted straight lines according to the calculated score of each of the extracted straight lines,
wherein the score calculator calculates the score of the first straight line by assigning a plus (+) score to each of the first contact points included in the first straight line and by assigning a minus (−) score to each of the second contact points included in the second straight lines.

2. The road boundary detection system of claim 1, wherein the parameter space generator generates the parameter space based on a parameter of a linear equation based on the measurement data.

3. The road boundary detection system of claim 1, wherein the score calculator calculates the score of the first straight line by using a Scoring Hough Transform algorithm (Ammumulator*($Z^t$)), wherein the Scoring Hough Transform algorithm is Accumulator*($Z^t$) =

$$\sum_{i=1}^{N}\left(\text{Accumulator}(r_i, \theta_i) - \sum_{j=1}^{[r_i]-1} \text{Accumulator}(r_i - j, \theta_i)\right),$$

wherein $r_i$ represents the distance, $\theta_i$ and represents the angle of each of the plurality of contact points.

4. The road boundary detection system of claim 1, wherein the road boundary determiner selects the straight line among the extracted straight lines for the road boundary according to a score having a higher value among the calculated scores of the extracted straight lines.

5. The road boundary detection system of claim 1, wherein the road boundary determiner divides the parameter space into a left side road boundary and a right side road boundary by comparing the distance and the angle of each of the plurality of contact points included in the parameter space with a reference distance and a reference angle.

6. The road boundary detection system of claim 1, wherein the optical scanner is a laser scanner.

7. A vehicle comprising:
an optical scanner configured to emit a light to an object to acquire measurement data reflected from the object; and
a processor comprising:
  a parameter space generator configured to:
    generate a parameter space by extracting a plurality of contact points and extracting a distance and an angle of each of the plurality of contact points based on the measurement data; and
    extract a plurality of straight lines including a first straight line and second straight lines in order of a priority on each of the plurality of straight lines, wherein a higher priority is given to each of the plurality of straight lines including more of the extracted contact points;
  a score calculator configured to calculate a score of the first straight line by assigning a cumulative score of the parameter space to first contact points included in the first straight line and to second contact points included in the second straight lines, the second contact points having the same angle as the first contact points; and
  a road boundary determiner configured to recognize a road boundary by selecting a straight line among the extracted straight lines according to the calculated score of each of the extracted straight lines,
wherein the score calculator calculates the score of the first straight line by assigning a plus (+) score to each of the first contact points included in the first straight line and by assigning a minus (−) score to each of the second contact points included in the second straight lines.

8. The vehicle of claim 7, wherein the parameter space generator generates the parameter space based on a parameter of a linear equation based on the measurement data.

9. The vehicle of claim 7, wherein the score calculator calculates the score of the first straight line by using a Scoring Hough Transform algorithm (Accumulator*($Z^t$)), wherein the Scoring Hough Transform algorithm is Accumulator*($Z^t$) =

$$\sum_{i=1}^{N}\left(\text{Accumulator}(r_i, \theta_i) - \sum_{j=1}^{[r_i]-1} \text{Accumulator}(r_i - j, \theta_i)\right),$$

wherein $r_i$ represents the distance, and $\theta_i$ represents the angle of each of the plurality of contact points.

10. The vehicle of claim 7, wherein the road boundary determiner selects the straight line among the extracted straight lines for the road boundary according to a score having a higher value among the calculated scores of the extracted straight lines.

11. The vehicle of claim 7, wherein the road boundary determiner divides the parameter space into a left side road boundary and a right side road boundary by comparing the distance and the angle of the plurality of contact points included in the parameter space with a reference distance and a reference angle.

12. The vehicle of claim 7, wherein the optical scanner is a laser scanner.

13. A road boundary detection method comprising:
acquiring measurement data reflected from an object when an optical scanner emits a light to the object;
generating a parameter space by extracting a plurality of contact points and extracting a distance and an angle of each of the plurality of contact points based on the measurement data;
extracting a plurality of straight lines including a first straight line and second straight lines in order of a priority on each of the plurality of straight lines, wherein a higher priority is given to each of the plurality of straight lines including more of the extracted contact points;

calculating a score of the first straight line by assigning a cumulative score of the parameter space to first contact points included in the first straight line and to second contact points included in the second straight lines, the second contact points having the same angle as the first contact points; and recognizing a road boundary by selecting a straight line among the extracted straight lines according to the calculated score of each of the extracted straight lines, wherein the calculation of score of the first straight line calculates the score of the first straight line by assigning a plus (+) score to each of the first contact points included in the first straight line, and by assigning a minus (−) score to each of the second contract points included in the second straight lines.

14. The road boundary detection method of claim 13, wherein the step of generating the parameter space generates the parameter space by using a parameter of a linear equation based on the measurement data.

15. The road boundary detection method of claim 13, wherein the calculation of score of each straight line calculates the score of the first straight line by using a Scoring Hough Transform algorithm Accumulator*($Z^t$), wherein the Scoring Hough Transform algorithm is $$\text{Accumulator}^*(Z^t) = \sum_{i=1}^{N} \left( \text{Accumulator}(r_i, \theta_i) - \sum_{j=1}^{[r_i]-1} \text{Accumulator}(r_i - j, \theta_i) \right),$$

and wherein $r_i$ represents a distance and, $\theta_i$ represents an angle of each of the plurality of contact points.

16. The road boundary detection method of claim 13, wherein the recognition of the road boundary selects the straight line among the extracted straight lines for the road boundary according to a score having a higher value among the calculated scores of the extracted straight lines.

* * * * *